No. 765,395. PATENTED JULY 19, 1904.
A. P. MORROW.
CLUTCH MECHANISM.
APPLICATION FILED FEB. 28, 1903.
NO MODEL.
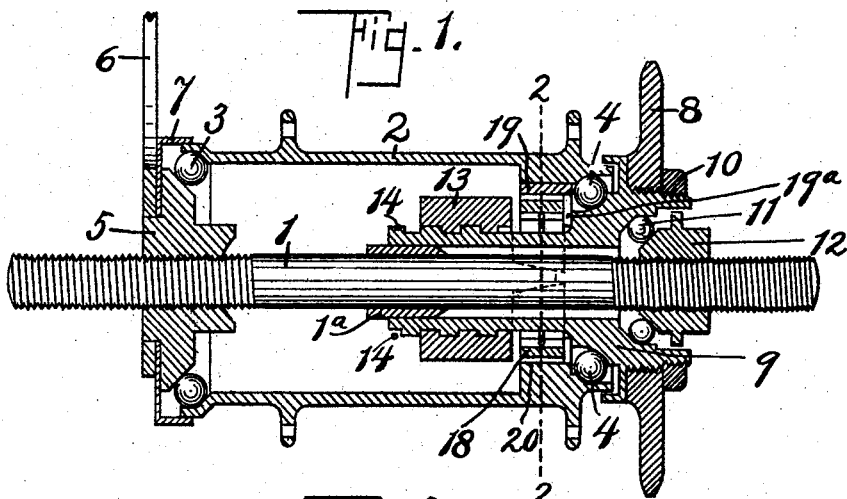
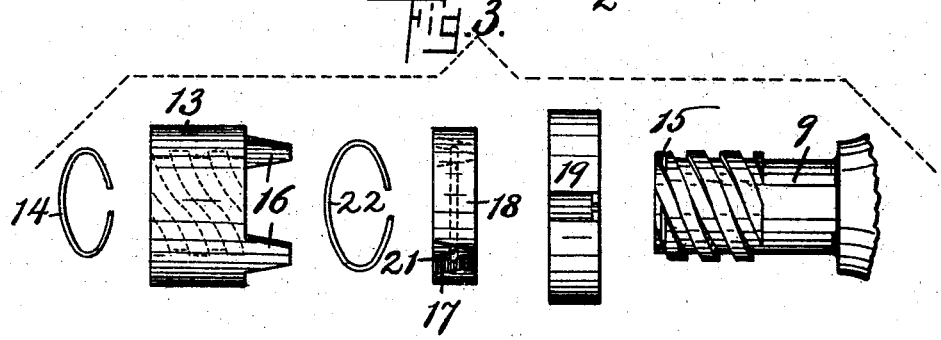
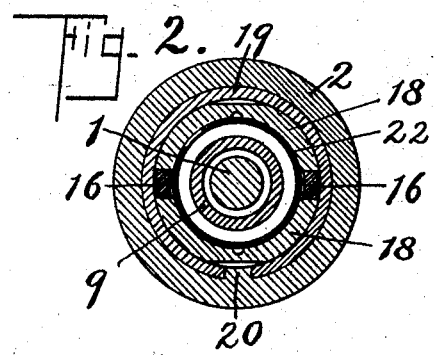
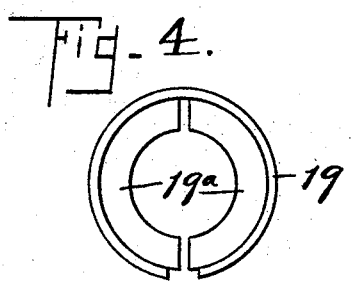
WITNESSES:
D. Gurnee.
I. Butler.
INVENTOR:
Alexander P. Morrow
by Osgood & Davis
Atty No. 765,395. Patented July 19, 1904.

UNITED STATES PATENT OFFICE.

ALEXANDER P. MORROW, OF ELMIRA, NEW YORK.

CLUTCH MECHANISM.

SPECIFICATION forming part of Letters Patent No. 765,395, dated July 19, 1904.

Application filed February 28, 1903. Serial No. 145,595. (No model.)

*To all whom it may concern:*

Be it known that I, ALEXANDER P. MORROW, a citizen of the United States, and a resident of Elmira, in the county of Chemung and State of New York, have invented certain new and useful Improvements in Clutch Mechanisms, of which the following is a specification.

This invention relates to clutch mechanisms for free-wheel driving mechanisms for bicycles and like vehicles.

The object of the invention is to produce a simple and efficient mechanism of the character mentioned; and it consists in the devices and arrangements hereinafter described and claimed.

In the drawings, Figure 1 is a longitudinal section through a hub embodying this invention. Fig. 2 is a section on the line 2 2 of Fig. 1. Fig. 3 is a view of the internal parts separated and in their relative positions, and Fig. 4 is an end view of one of the parts.

The device is shown as applied to the rear hub of a bicycle.

1 is the axle, and 2 is the hub, provided with suitable races or ball-cups for the series 3 and 4 of the balls of the ball-bearings. One end of the hub has a race or cone 5 screwed upon the axle and fastened, if desired, by a suitable lock-nut, (not shown,) whereby also the ends of the rear forks of the frame of the bicycle may be attached to the axle 1. The cone 5 may have a brake-arm 6 rigidly attached to it, so that said brake-arm may also be attached to one of the frame-pieces of the bicycle in order to sustain strains caused by friction of the ball-bearings or otherwise and relieving the cone therefrom and also adapting the hub for attachment to different frames. The arm 6 may be omitted in many cases. A dust-cup 7 may, if desired, be attached to the cone 5 and fit over the adjacent end of the hub 2. On the opposite end of the hub is a sprocket-wheel 8, screwed upon the driving-sleeve 9 and fastened thereon by a lock-nut 10. The sprocket-wheel 8 may be fastened to said sleeve in any other suitable manner. This constitutes the driving part of the mechanism, and the hub is the driven part thereof. An exterior surface upon the sleeve 9 is the race or cone for the series of balls 4, and an internal surface on said sleeve is the race or cup for a third series of balls 11, the race or cone 12 for which is screwed upon the axle and may be fastened in place by a lock-nut, (not shown,) which also may act as the means of fastening the axle at that end to the frame of the bicycle.

The sleeve 9 is externally screw-threaded on its inner end and carries a nut 13, which may be prevented from running off the end of the sleeve by a split ring 14, resting in a circumferential groove 15 near the end of the sleeve 9. The nut 13 carries one or more wedges 16, having their bases upon the nut and extending parallel or substantially parallel to the axis thereof. The wedge or wedges 16 extend into correspondingly-shaped slots 17 in an expansible split clutch-ring 18, preferably formed in two parts, as shown, which lies within a split ring 19, which is held nonrotary in the hub against an abutment 20 thereon and forms a changeable friction-surface on the hub.

The split ring 19 may be omitted, if desired, and the clutch 18 may fit within and act on a surface directly upon the hub and may have one wedge-slot to coöperate with a single wedge on the nut 13. The clutch 18 has an internal groove 21, in which is a spring 22, which tends to expand said clutch against its bearing-surface, which in the form shown is the ring 19. The spring 22 can be adjusted for tension so that the expansible clutch 18 shall press against its bearing-surface with more or less friction. It is of course desirable that the friction just mentioned should be light and should be just sufficient to retard the movement of the nut 13 with reference to the driving part or sleeve 9.

As applied to a bicycle this device is a driving and coasting clutch. Its operation is as follows: In forward driving rotation of the sleeve 9 moves the nut 13 toward the right, in Fig. 1, so that the wedges 16 press into the slots 17 and expand the clutch 18, so that a firm clutching action occurs between the hub and the driving mechanism. The greater the driving pressure the greater will be the clutching force. If the rider desires to coast, he holds the pedals stationary, thereby stopping the rotation of the sleeve 9. While the sleeve 9 is stationary and the hub continues to rotate the nut 13 will run along the threads on the sleeve 9, withdrawing the wedges 16 from the slots in the clutch 18 and releasing the clutching connection between the clutch 18 and its bearing-surface on the hub. As soon as this operation occurs the hub 2 can continue its rotation free from the clutch 18, except for a certain small amount of friction between the two, which is maintained by the spring 22 in order to secure certainty of movement of the nut 13 with reference to the sleeve 9. When the rider resumes forward pedaling, the said friction secures certainty of movement of the nut 19 and quick direct positive clutching between the sleeve 9 and the hub. The wedges 16 are never fully withdrawn from their slots. Of course backward rotation of the sleeve 9 will release the clutch from the hub in the same manner as the cessation of rotation of the sleeve above described.

The ring 19 preferably has inturned flanges 19ª for stiffening it and to form a surface for retaining the clutch 18 in place, and they bear against a shoulder on the sleeve 9, so as to relieve the bearings from pressure during forward driving. The axle 1 may have upon it an expansion 1ª for carrying the end of the sleeve 9.

It is obvious that this device is not limited to its employment in the precise mechanism above described.

This clutch makes no noise in operation and takes up all wear automatically. It operates very rapidly both for clutching and for releasing and is extremely powerful and certain.

What I claim is—

1. The combination of a driving part; a driven part; a longitudinally-movable wedge between said parts; connecting means between said driving part and said wedge for producing longitudinal movement of the latter; an expanding clutch-ring between said driving part and said driven part, having a wedge-slot adapted to receive said wedge, and adapted when expanded by said wedge to engage said driven part and to make a driving connection between said driving part and said driven part.

2. The combination of a hub; a screw-threaded driving-sleeve; a longitudinally-movable wedge between said hub and said sleeve; a nut on said sleeve for producing longitudinal movement of said wedge; an expanding clutch-ring between said hub and said sleeve, having a wedge-slot adapted to receive said wedge, and adapted when expanded by said wedge to engage the hub, and to make a driving connection between said sleeve and said hub.

3. The combination of a hub; an axle; a screw-threaded driving-sleeve; a two-part expanding clutch-ring having wedge-slots between the ends of the two parts thereof; a nut on said sleeve carrying wedges extending into said wedge-slots to expand said clutch against the hub to produce the driving connection, and means for retarding said nut with reference to the driving-sleeve.

4. The combination of a hub, an axle, a screw-threaded driving-sleeve, a two-part expanding clutch-ring having wedge-slots between the ends of the two parts thereof, a nut on said sleeve carrying wedges extending into said wedge-slots to expand said clutch against the hub to produce the driving connection, and spring means in said clutch-ring normally expanding said clutch-ring against the hub.

5. The combination of a hub, an axle, a screw-threaded driving-sleeve, a two-part expanding clutch-ring having wedge-slots between the ends of the two parts thereof, a nut on said sleeve carrying wedges for expanding said clutch-ring by entering said wedge-slots therein, spring means for normally expanding said clutch-ring, and a split ring non-rotatable in said hub and having separated inturned flanges.

ALEXANDER P. MORROW.

Witnesses:
J. C. FERGUSON,
D. L. WHITTIER.